United States Patent
Accapadi et al.

(10) Patent No.: US 11,074,101 B2
(45) Date of Patent: Jul. 27, 2021

(54) AUTOMATED SWITCHING BETWEEN INTERRUPT CONTEXT I/O PROCESSING AND THREAD CONTEXT I/O PROCESSING

(71) Applicant: International Business Machines Corporation, Armonk, NY (US)

(72) Inventors: Mathew Accapadi, Cedar Park, TX (US); Chad Collie, Springdale, AZ (US); Vani D. Ramagiri, Autstin, TX (US); Lloyd Phillips, Austin, TX (US); Anil Kalavakolanu, Austin, TX (US); Teresa Hong Pham, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 16/167,859

(22) Filed: Oct. 23, 2018

(65) Prior Publication Data
US 2020/0125395 A1    Apr. 23, 2020

(51) Int. Cl.
*G06F 9/48* (2006.01)
*G06F 9/50* (2006.01)

(52) U.S. Cl.
CPC ............ *G06F 9/4812* (2013.01); *G06F 9/505* (2013.01); *G06F 9/5033* (2013.01)

(58) Field of Classification Search
CPC .................................................... G06F 9/4812
See application file for complete search history.

(56) References Cited

U.S. PATENT DOCUMENTS

| | | | |
|---|---|---|---|
| 9,183,167 B2 | 11/2015 | Liu et al. | |
| 9,619,284 B2 | 4/2017 | Sakarda | |
| 2009/0077564 A1 | 3/2009 | Loeser | |
| 2014/0189185 A1* | 7/2014 | Yamashita | G06F 13/24 710/267 |
| 2018/0074849 A1* | 3/2018 | Vanka | G06F 9/4893 |
| 2018/0101486 A1 | 4/2018 | Lu et al. | |
| 2018/0300130 A1 | 10/2018 | Appu et al. | |

OTHER PUBLICATIONS

Raju Pandey, "Process and Thread Scheduling," Department of Computer Sciences, University of CA, 2005, 42 pgs.
Pål Halvorsen, INF1060: Introduction to Operating Systems and Data Communication, "Operating Systems: Processes & CPU Scheduling," University of Oslo, Sep. 19, 2017, 41 pgs.
(Continued)

*Primary Examiner* — Sisley N Kim
(74) *Attorney, Agent, or Firm* — Cantor Colburn LLP; David Quinn (57) ABSTRACT

Embodiments include method, systems and computer program products for switching between interrupt context input/output I/O processing versus thread context I/O processing. The method includes receiving, by a processor of a plurality of processors, an interrupt. A device driver for an I/O adapter determines that the dispatch latency for an associated kernel thread is greater than a first predetermined threshold. An adapter switches to an interrupt context mode. The adapter processes an I/O on the processor associated with the received interrupt to completion.

12 Claims, 4 Drawing Sheets

(56) References Cited

OTHER PUBLICATIONS

Authors et. al.: Disclosed Anonymously, "PMU Driven Performance Prediction for Aggressive Affinitisation," An IP.com Prior Art Database Technical Disclosure, IP.com No. IPCOM000219133D, Jun. 21, 2012, 6 pgs.

Authors et. al.: IBM, "System and Method to Optimize Cache and Memory Affinity in a Virutalized Environment," An IP.com Prior Art Database Technical Disclosure, IP.com No. IPCOM000133807D, Feb. 9, 2006, 5 pgs.

Authors et. al.: IBM, "Tool for Periodic Extraction of Multi-Level Dispatch Affinity Information," An IP.com Prior Art Database Technical Disclosure, IP.com No. IPCOM000012046D, Apr. 3, 2003, 3 pgs.

* cited by examiner

AUTOMATED SWITCHING BETWEEN INTERRUPT CONTEXT I/O PROCESSING AND THREAD CONTEXT I/O PROCESSING

BACKGROUND

The present invention relates to handling interrupts in a computer system, and more particularly to increasing interrupt handling efficiency in a logically partitioned computer system.

Computer systems, processors, caches, I/O devices and other devices in the computer architecture access data in memory using one or more memory controllers. The processors can be general purpose and include multiple cores and/or employ simultaneous multi-threading. Computers systems can utilize n operating system ("OS") as an interface between their applications and the computer hardware.

SUMMARY

Embodiments of the invention are directed to a method of switching between interrupt context input/output (I/O) processing versus thread context I/O processing. A non-limiting example of the computer-implemented method includes receiving, by a processor of a plurality of processors, an interrupt. A device driver for an I/O adapter determines that the dispatch latency for an associated kernel thread is greater than a first predetermined threshold. An adapter switches to an interrupt context mode. The adapter processes an I/O on the processor associated with the received interrupt to completion.

Embodiments of the invention are directed to a computer program product that can include a storage medium readable by a processing circuit that can store instructions for execution by the processing circuit for performing a method of switching between interrupt context input/output (I/O) processing versus thread context I/O processing. A non-limiting example of the method includes receiving an interrupt. A device driver for an I/O adapter determines that the dispatch latency for an associated kernel thread is greater than a first predetermined threshold. An adapter switches to an interrupt context mode. The adapter processes an I/O on the processor associated with the received interrupt to completion.

Embodiments of the invention are directed to a system. The system includes a plurality of processors in communication with a memory. The system includes a plurality of adapters coupled to the plurality of processors. A processor of the plurality of processors is operable to receive an interrupt. Device drivers for each of the plurality of adapters are operable to determine a dispatch latency for an associated kernel thread is greater than a first predetermined threshold. Each of the plurality of adapters is further operable to switch to an interrupt context mode. Each of the plurality of adapters is further operable to process an input/output (I/O) on the processor associated with the received interrupt to completion.

Additional technical features and benefits are realized through the techniques of one or more embodiments the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection".

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In accordance with exemplary embodiments of the disclosure, methods, systems, and computer program products for operating a computer system having an input/output (I/O) adapter utilizing a hybrid interrupt processing approach is described herewith.

An I/O adapter includes a device driver which manages the interaction of the I/O adapter with an operating system. The operating system then manages interactions with applications associated with a given system. For example, when a data packet is transmitted or received, completion of the processing of that data packet by the I/O adapter needs to be communicated to the appropriate application, i.e. either the application from which the data packet was sent (outbound) or the application to which the data packet is destined (inbound).

The notification of events to the operating system is performed primarily through the use of interrupts. When an event occurs that requires notification to an application, an interrupt is generated by the I/O adapter and sent to the operating system. Depending on a priority of an interrupt, a processor may respond by suspending current activities, saving state, and executing a function (i.e., an interrupt handler) to service the event. For example, hardware interrupts may be generated by an input/output (I/O) device, e.g., a disk drive controller, a keyboard, a mouse, or another peripheral device. In contrast, software interrupts may be caused either by an exception condition in a processor or a special instruction in an instruction set architecture (ISA) that, when executed, causes an interrupt to be generated. Following interrupt servicing, a processor resumes suspended activities.

An interrupt handler associated with the operating system performs appropriate processing on the interrupt to determine how to handle the occurrence of the event. The interrupt handler, also known as an interrupt service routine (ISR), is a callback function (e.g., implemented in firmware, an operating system (OS), or a device driver) whose execution is triggered by an interrupt. Interrupt handlers perform various interrupt dependent functions. For example, pressing a key on a computer keyboard or moving a computer mouse triggers interrupts that call respective interrupt handlers to read a key or a mouse position and copy associated information into the memory of a computer. In data processing systems, an interrupt controller may be implemented to combine multiple interrupt sources onto one or more processor exception lines, while facilitating the assignment of priority levels to different interrupts.

High speed I/O adapters can cause a high rate of interrupts for the operating system. As mentioned above, as the speed of the network increases, so does the number of events that occur and thus, the number of interrupts. I/O adapters can employ various means to process interrupts. For example, when a central processing unit (CPU)/central processor is interrupted, an I/O adapter driver can run code that can be used to process an I/O completion event on the CPU (first method), or when a CPU is interrupted, an I/O adapter driver can run a kernel thread that when dispatched, will process that I/O completion event (second method). However, each exemplary interrupt handling has advantages and drawbacks.

An advantage to the first method is that I/O completion can be handled immediately on the interrupted CPU, which allows the associated completion event to be processed right away. A disadvantage of the first method is that often interrupts are presented to CPUs in a round-robin order, which can cause I/O completion instructions and associated data to be run on a different CPU each time. I/O completion on different CPUs can result in increased cache misses due to previously executed instructions and data residing within another CPU's cache. Accordingly, processing time can increase due fetching the instructions and data from main memory in response to the cache miss.

An advantage of the second method is that if a kernel thread is undertaking the I/O processing for each I/O completion, instructions and data associated with the kernel thread needed to process I/O completions remain on the CPU where that kernel thread is running. In a busy system, the kernel thread which will typically run at a favored priority will continue to run on the CPU usually achieving a cache affinity with that CPU. The disadvantage of the second method is that on a system where I/O completions are sporadic, a kernel thread responsible for I/O completions will go idle leading to the removal of the kernel thread from the CPU. When the kernel thread begins running again, the kernel thread may find that the previous CPU in which the kernel thread was performing I/O completions is currently occupied. To make matters worse, a time to dispatch (latency) for the kernel thread to another CPU could be elongated based on a kernel's CPU dispatch/affinity algorithms, as well as a load on the other CPUs in the server. Therefore, the dispatch latency of the associated kernel thread can significantly impact the I/O completion time.

These problems are made even more evident when the I/O adapter is associated with a logically partitioned host system. Since each logical partition may have its own set of applications, its own operating system, memory resources, etc., the problems of large numbers of interrupts and processing thereof is made more complex. Accordingly, having an I/O adapter that can employ a hybrid approach to interrupt handling would be beneficial.

Turning now to an overview of aspects of the present invention, one or more embodiments of the invention provide methods, systems, structures and computer program products configured to automatically switch between interrupt context I/O processing versus thread context I/O processing based on thread dispatch latency values or CPU affinity statistics. An adapter's device driver can employ a variety of I/O processing techniques, i.e., (1) using a dispatch latency time to control whether an interrupt will be addressed by a CPU receiving the interrupt or by another CPU, (2) using CPU affinity statistics to control whether an interrupt will be addressed by a CPU receiving the interrupt or by another CPU and/or (3) using a work limit for an adapter to control whether a workload is offloaded to a kernel thread or whether an interrupt will be addressed by a CPU that did not receive the interrupt, to process an I/O. Accordingly, I/O processing of the present invention can handle I/O completion immediately on the CPU that received the interrupt, as well as if a kernel thread is doing the I/O processing for each I/O completion, the kernel thread's instructions and data can be processed to completion on the CPU where that kernel thread is running.

Figure 1:
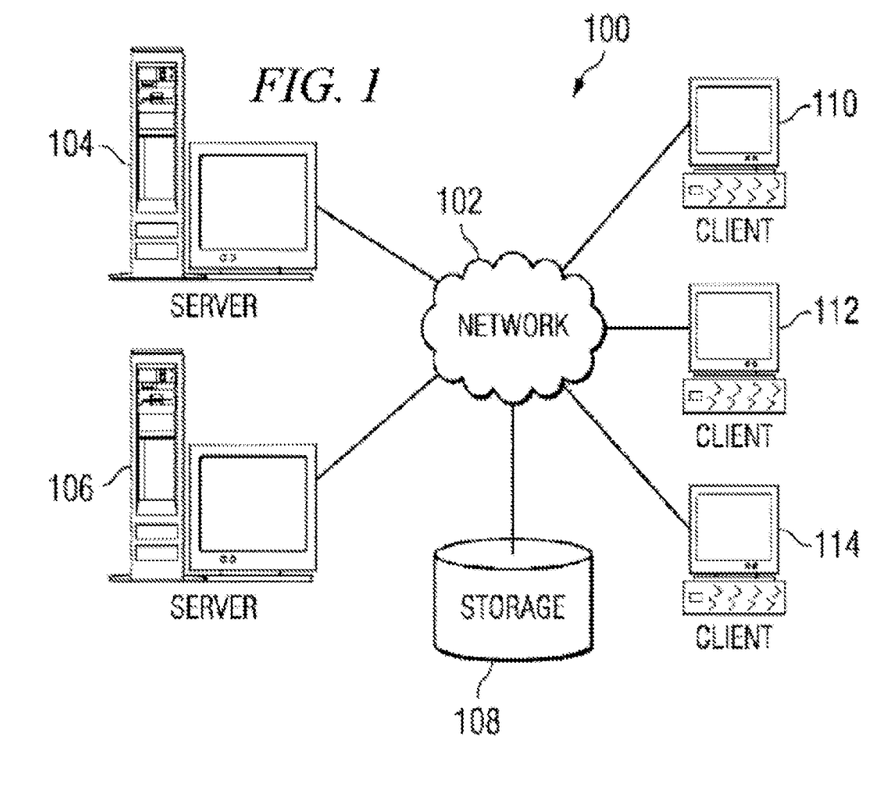
FIG. 1 is an exemplary diagram of a distributed data processing system in which exemplary aspects of the present invention may be implemented.

With reference now to the figures, FIG. 1 depicts a pictorial representation of an exemplary distributed data processing system in which aspects of the illustrative embodiments of the present invention may be implemented. Distributed data processing system 100 may include a network of computers in which instances of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the exemplary embodiments of the present invention may be implemented.

Figure 2:
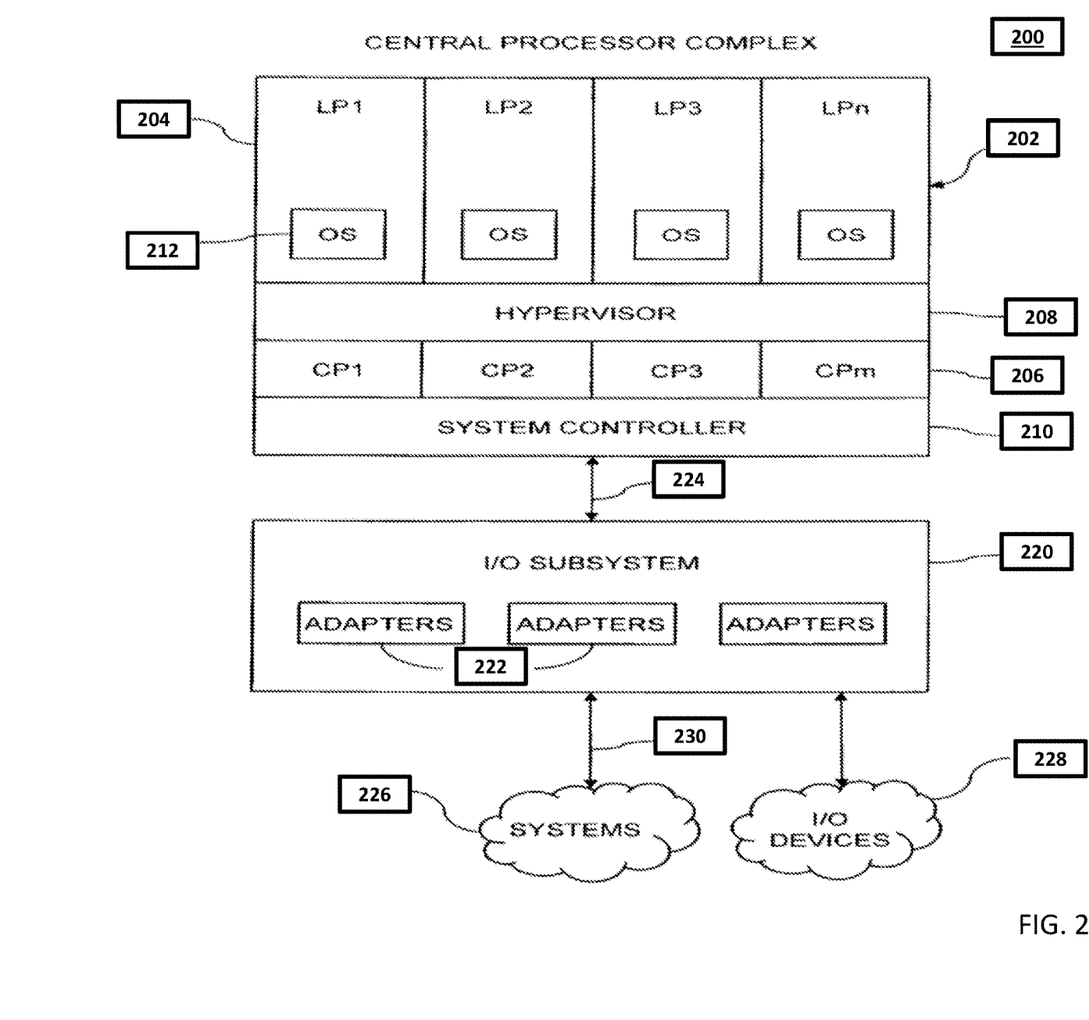
FIG. 2 is a block diagram illustrating a block diagram of an exemplary computing environment is shown in which aspects of the exemplary embodiments of the present invention may be implemented.

With reference now to FIG. 2, a block diagram of an exemplary computing environment is shown in which aspects of the exemplary embodiments of the present invention may be implemented. Computing environment 200 includes, for instance, a Central Processor Complex (CPC) 202 coupled to an input/output (I/O) subsystem 220. The CPC 202 in the present example includes one or more partitions 204, e.g., logical partitions LP1-LPn, and one or more CPUs/central processors 206, e.g., CP1-CPm. The CPC 202 further includes a hypervisor 208, e.g., a logical partition manager, and a system controller 210, each of which is described below. The I/O subsystem 220 includes a number of I/O adapters 222 being arranged logically and/or physically external to one or more of the central processors 206.

At least one of the mentioned I/O adapters 222 can initiate the setting of an interrupt, such as an I/O interrupt, at one or more of the central processors 206. For this purpose, the one of the I/O adapters 222 can directly send a request to a system controller 210 coupled to a particular I/O adapter 222 and the central processors 206. The request designates a particular zone and I/O interrupt subclass within the processing environment for which a pending interrupt is to be set. The system controller 210 builds a command based on the request and sends the command to one or more central processors 206. In response to receiving that command at least one central processor 206 can set one or more pending interruption array indicators, e.g. an indicator in a pending interruption array and a filter pending interruption array of an associated central processor 206 for the zone and interruption subclass designated in the command.

Each logical partition 204 is capable of functioning as a separate (virtual) system. That is, each logical partition can be independently reset, initially loaded with an operating system (OS), if desired, and operate with different programs. An operating system (e.g. OS 212) or application program running (not shown) in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time sliced manner. In this particular example, each logical partition has a resident operating system 212 which may differ for one or more logical partitions. In addition, each logical partition has assigned thereto a portion of system main storage (memory), which is referred to as a "zone".

A logical partition 204 includes one or more logical processors (not shown). Each central processor 206 may be permanently allocated to a particular logical processor, or may be in a pool of central processors 206 available for dynamic allocation to any group of logical processors, possibly spanning multiple logical partitions 204. Logical partitions 204 are managed by hypervisor 208 implemented by firmware running on the central processors 206. Logical partitions 204 and hypervisor 208 can each comprise one or more programs residing in respective portions of central storage associated with the central processors 206.

Central processors 206 can be coupled to system controller 210. System controller 210 can preferably be a hardware component that controls access to memory and caches within the central processors 206 and communicates between the processors and input/output subsystem 220. The system controller 210 can be responsible for the queuing, serialization and execution of requests made by the central processors 206 and the I/O subsystem 220. In one example, the system controller 210 is responsible for sending commands to particular central processors 206 and/or broadcasting commands to multiple central processors 206. The system controller 210 may be a centralized component or its functions may be distributed.

The I/O subsystem 220 is preferably coupled to the system controller 210 via one or more buses 224. Further, the I/O subsystem 220 can be coupled to other systems 226 and/or to I/O devices 228 (e.g., control units, input devices, printers, other output devices, etc.) via one or more links 230.

The I/O adapters 222 of the I/O subsystem 220 transform the protocol of the system controller 210 to the protocols of the one or more links 230 (and vice versa) to allow efficient communication between the CPC 202 and other systems and/or I/O devices. The I/O adapter 222 receives packets over the one or more links 230, and in response thereto, may determine that an interruption initiative is to be set pending at the central processors 206 of the processing environment. When an interruption initiative is to be set, the I/O adapter 222 can directly send a request to the system controller, and the system controller instructs the central processors 206 to set the pending interruption initiatives.

Figure 3:
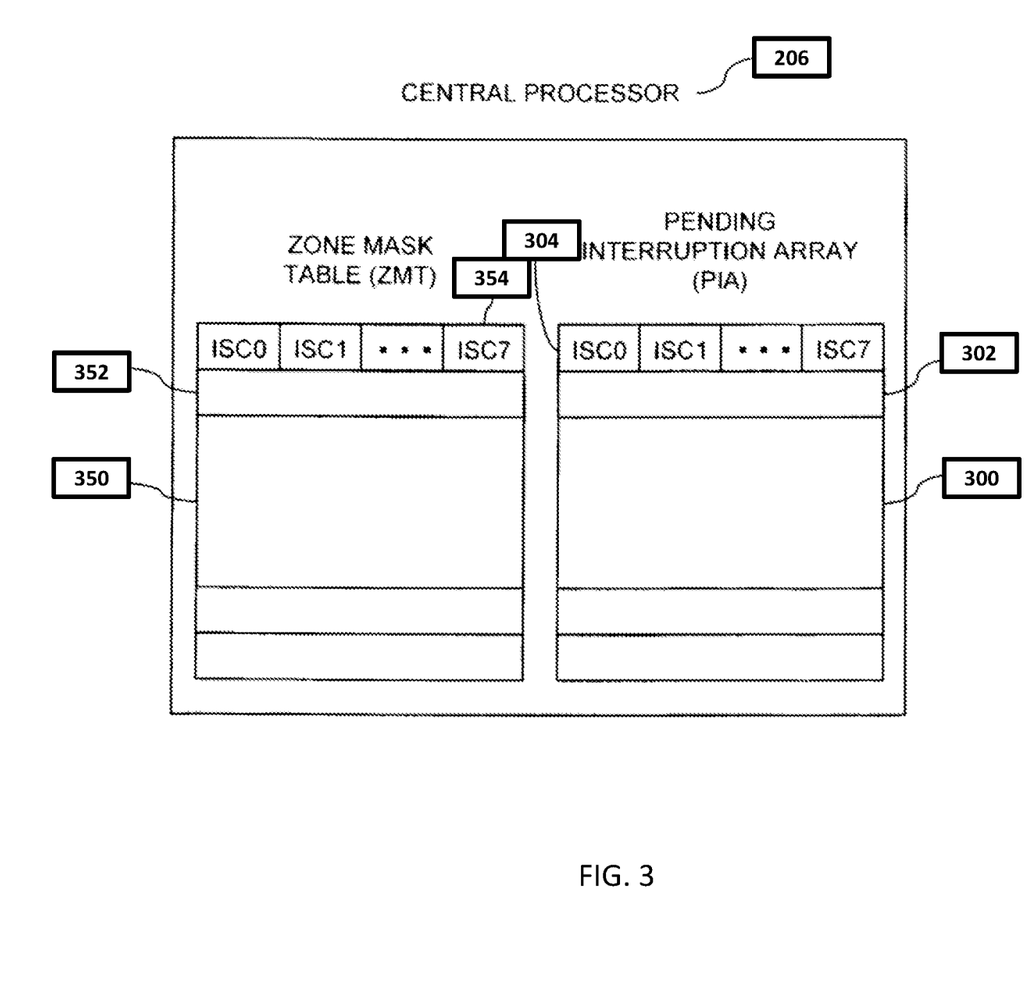
FIG. 3 is a pending interruption array for setting initiatives using indicators is shown in which aspects of the exemplary embodiments of the present invention may be implemented.

FIG. 3 illustrates a block diagram of a pending interruption array (PIA) 300 in which aspects of the exemplary embodiments of the present invention may be implemented. The PIA 300 is a hardware component residing in a central processor 206. The PIA 300 includes an entry, e.g. a row 302, for each memory assigned to a logical partition (zone) within the processing environment. In one example, the processing environment includes 64 zones, and therefore, there are 64 entries in the pending interruption array. Each entry includes an indicator 304 for each I/O interruption subclass (ISC) associated with the zone. An interruption subclass represents one of a plurality of possible subclasses of interruption, and in one example, there are eight interruption subclasses. Each interruption subclass is associated with one or more sources of the interruption. When a bit is turned on in the pending interruption array, it indicates that an interruption is pending for that particular interruption subclass of that zone (i.e., ZONE.ISC).

Each interruption subclass (e.g., ISCO-ISC7) has a corresponding I/O interruption queue that holds one or more pending interruptions. The I/O interruption queues are located within system memory, and each has an interruption queue header (IQH) associated therewith. The IQH can include the initiatives made pending. To handle an interruption made pending, a zone mask table (ZMT) 350 can be employed. The ZMT 350 can also have an entry 352 for each zone of the processing complex and an indicator 354 for each interruption subclass of each zone.

All central processors 206 have the technical ability to accept and handle I/O interrupts of all zones, but only those central processors 206 enabled for a particular I/O interrupt for which a ZMT mask bit can be set is enabled to process the particular I/O interrupt. Since each central processor 206 may be enabled for several I/O interrupts, prioritization logic exists to present only one pending I/O interrupt at a time to an interrupt handler (not shown).

The interrupt handler can employ different approaches to process I/O interrupts. For example, a round robin approach can be employed that that selects the next thread in a list of threads for processing. The thread chosen can be restricted to only threads that have last run on the current central processor 206. This round robin approach ensures that all threads in the list of threads are processed even if instructions and/or associated data were run on another CPU. When the interrupt handler is a part of a kernel (i.e., a core or central portion of an operating system (e.g., OS 212) that provides services for all other parts of the operating system), the interrupt handler can manage all requests or completed I/O operations that need the kernel's services. The kernel may also include a scheduler that determines which programs share the kernel's processing time and in what order. The kernel may also include a supervisor that allocates use of a computing device to each process when it is scheduled. Combining aspects of a round robin approach with aspects of interrupt handling as part of a kernel in an automated hybrid approach can take advantage of benefits of both implementations while mitigating the disadvantages associated with each implementation.

An approach for handling interrupts associated with one or more embodiments of the present invention is that when an interrupt is generated, the I/O adapter 222 can store a current time the interrupt occurs along with the associated interrupt. The I/O adapter 222 can also run a kernel thread that can be used to process the generated interrupt. When the kernel thread is dispatched, the kernel thread can use a difference (i.e., delta) between a time that the kernel thread was dispatched and the previously stored time indicating when the interrupt occurs. The delta is a dispatch latency time which can be used to form a histogram. The histogram can maintain a count of kernel dispatches that fall within a range of dispatch latency times in one or more counters.

The one or more histogram counters can be reset back to zero so that counts are not skewed over a long period of time. An exemplary histogram could employ a first level which could be associated with dispatch latencies of 100 microseconds or less, a second level which could be associated with dispatch latencies between 100 and 1000 microseconds, a third level which could be associated with dispatch latencies between 1000 and 10000 microseconds, a fourth level which could be associated with dispatch latencies between 10000 and 100000 microseconds and a fifth level which could be associated with dispatch latencies above 100000 microseconds.

Subsequent storage of current interrupt times by the I/O adapter 222, the I/O adapter 222 can determine, based on a count for each histogram level, as well as a size associated with each histogram level, whether the kernel thread dispatch time is increasing, and if the kernel dispatch thread is increasing, whether the increased kernel dispatch time is greater than a predetermined threshold. If the increased kernel dispatch time is greater than a predetermined threshold, the I/O adapter 222 can switch to an interrupt context mode (i.e., a process of storing the state of a process or of a thread, so that it can be restored and execution resumed from the same point later) and allow an I/O completion to occur on a CPU receiving the interrupt. If the kernel thread dispatch time is not increasing, or if the increased kernel dispatch time is not greater than the predetermined threshold (i.e., lower levels of the histogram outweigh the higher levels of the histogram), then the I/O adapter 222 can run the kernel thread on a different CPU in order to process the I/O.

An approach for handling interrupts associated with one or more embodiments of the present invention is that the kernel thread can utilize a CPU ID associated with each CPU to keep track of which CPU is associated with a particular kernel thread dispatch. When the kernel thread is dispatched, the kernel thread can compare CPU ID associated with the current dispatch with a stored CPU ID representing a previous CPU processing the I/O. If the CPU IDs are different, the kernel thread can increment a counter. The kernel thread can also increment a different counter for every time the kernel thread is dispatched.

The I/O adapter 222 can calculate a CPU affinity statistic for its associated kernel thread based on the number of times the thread was dispatched compared to the number of times the thread was dispatched to the same CPU on which the thread previously ran. The adapter's device driver software can determine an affinity percentage value using these two metrics. The higher the CPU affinity percentage (meaning that the thread was being dispatched to the same CPU more often), then the more likely it is that the thread's instructions and data are still in that CPU's cache. In such a scenario, it would be advantageous to continue to use the kernel thread to process the work items associated with the interrupt. A method of determining an ideal CPU affinity percentage would be implemented through the use of a configurable threshold (e.g., 50%). If the calculated CPU affinity percentage is lower than the threshold, the I/O adapter 222 can process the interrupt on the CPU where the interrupt arrived. If the CPU affinity percentage calculated is higher than the threshold, then it may be advantageous to let the kernel thread process the work items associated with the interrupt. When deciding whether to utilize the CPU in which the interrupt was received or the kernel thread, one or more approaches can be employed, which is further described below.

An approach for handling interrupts associated with one or more embodiments of the present invention is that I/O adapter 222 can be equipped with a tunable limit for how many items of work (e.g., data packets) can be processed within a single interrupt. If the I/O adapter 222 is not equipped with a tunable limit, and if additional work items arrive before an interrupt context has completed, then it may not exit out of interrupt context for a very long time. This can keep a CPU in an interrupt disabled state for too long causing less favored interrupts to be blocked on the CPU.

To address this issue, the I/O adapter 222 can use a counter to maintain a count of how often a work limit (i.e., a data packet processing limit for the CPU) has been reached within a set amount of time (or if there was no limit, maintain a count of how many work items the I/O adapter 222 has processed within the same interrupt context). The count can be used to offload work to a kernel thread (i.e., queued off or offloaded to a kernel thread which can be dispatched to another CPU to process the work items) if the work limit has been reached or exceeded (thus allowing the I/O adapter 222 to process interrupts more quickly.

Each approach can be used to provide information that can be used in a decision making process of whether to dispatch a kernel thread to process the interrupt or whether to process the interrupt on the CPU that received the interrupt. While each approach can be used individually, using all three can improve the decision making process. Each approach can be weighted. Each device driver for an associated I/O adapter 222 can decide based on the weights for each approach or using tunable values associated with work limits, dispatch latencies and/or cache miss rates, which approach or approaches to use.

Figure 4:
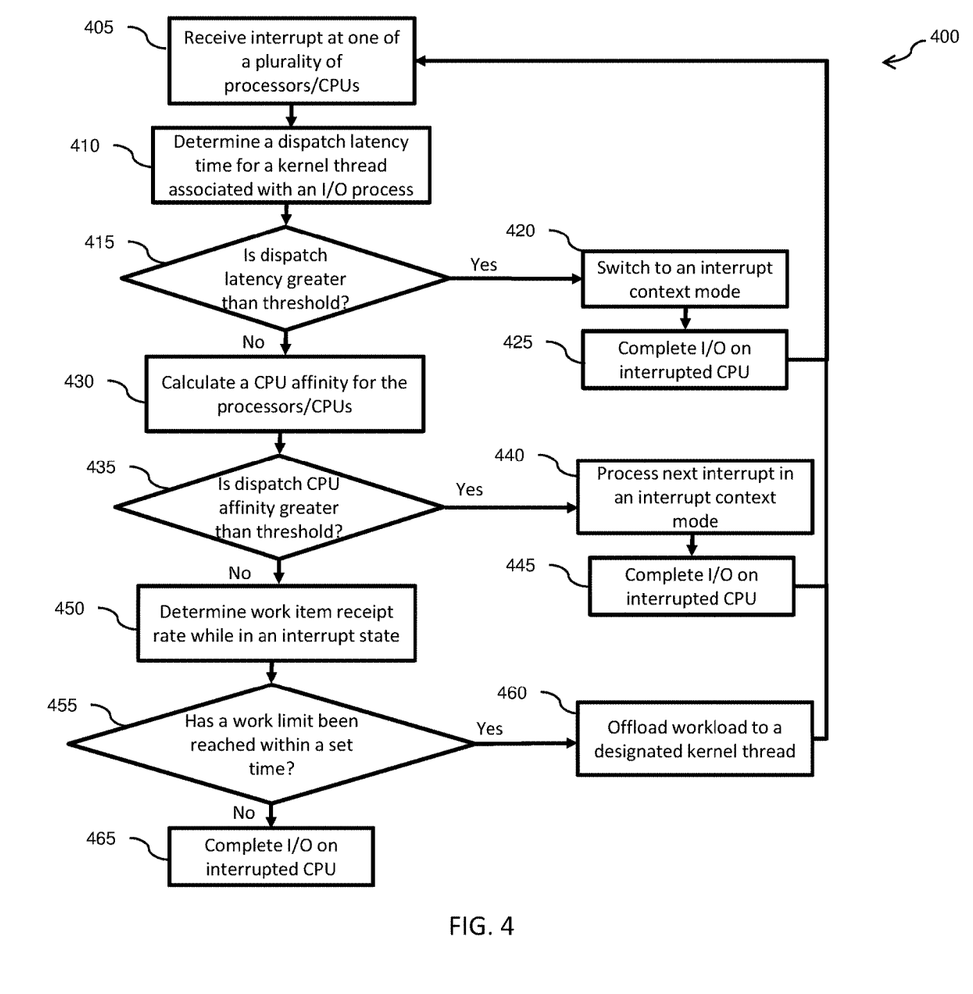
FIG. 4 is a flow diagram illustrating a method of switching between interrupt context I/O processing versus thread context I/O processing according to one or more embodiments of the present invention.

FIG. 4 is a flow diagram 400 illustrating a computer-implemented method of switching between interrupt context I/O processing versus thread context I/O processing according to one or more embodiments of the present invention. After starting at block 405, a central processor/CPU of a plurality of central processors/CPUs of a computer system receives an interrupt request, for example, an I/O interrupt request. At block 410, the computer-implemented method can determine a dispatch latency time for a kernel thread associated with an I/O process. At block 415, the computer-implemented method can determine whether the dispatch latency time is greater than a predetermined threshold, for example, 500 microseconds, which can be tunable based on changes to histogram counts associated with dispatch latency times. If the dispatch latency time is greater than the predetermined threshold, the computer-implemented method proceeds to block 420 where an adapter, for example, an I/O adapter, can switch to an interrupt context mode, and at block 425, the I/O can be processed to completion on the central processor/CPU receiving the interrupt.

If the dispatch latency time is not greater than the predetermined threshold, the computer-implemented method proceeds to block 430 where a CPU affinity can be calculated for the plurality of central processors/CPUs. At block 435, the computer-implemented method can determine whether the CPU affinity is greater than a predetermined threshold, for example, 50%. If the CPU affinity is greater than the predetermined threshold, the computer-implemented method proceeds to block 440 where the adapter can cause a next interrupt to be processed in an interrupt context mode, and at block 445, the I/O can be processed to completion on the central processor/CPU receiving the interrupt.

If the CPU affinity is not greater than the predetermined threshold, the computer-implemented method proceeds to block 450 where the computer-implemented method can determine a work item rate (e.g., network packets or storage I/Os) for the CPU receiving the interrupt. At block 455, the computer-implemented method can determine whether a work limit has been reached by the CPU (i.e., a packet receipt limit, (e.g., 100,000 data packets per second)). If the work limit has been reached, the computer-implemented method proceeds to block 460 where the adapter can offload work to a kernel thread. If the work limit has not been reached, the computer-implemented method proceeds to block 465, where the I/O is processed to completion on a different central processor/CPU than the central processor/CPU receiving the interrupt.

Embodiments of the present invention an automated hybrid approach such that it can benefit from the advantages of both an adapter driver runs that processes an I/O to an I/O completion event on a CPU receiving an interrupt in an interrupt context, as well as an adapter driver that can make running a kernel thread that when dispatched, processes an I/O to an I/O completion event. Accordingly, the present invention provides a computer system capable of determining if a CPU to cache affinity is not going to be good or if significant dispatch latencies for the kernel thread have been detected. The adapter driver can process the interrupt completely on the CPU in which the hardware interrupt occurred.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of switching between interrupt context input/output I/O processing versus thread context I/O processing, the method comprising: receiving, by a processor of a plurality of processors, an interrupt; determining, by a device driver for an I/O adapter, that a dispatch latency time for an associated kernel thread is greater than a first predetermined threshold; switching, by an adapter, to an interrupt context mode; processing, by the adapter, an I/O on the processor associated with the received interrupt to completion; calculating a central processing unit (CPU) affinity for the plurality of processors in response to the dispatch latency time being below the first predetermined threshold; determining that a work limit has been reached in response to the CPU affinity being below a second predetermined threshold in response to calculating the CPU affinity; and processing the I/O on a processor of the plurality of processors not associated with the received interrupt to completion in response to determining that the work limit has not been reached.

2. The computer-implemented method of claim 1, wherein the first predetermined threshold is a configurable value set by the device driver.

3. The computer-implemented method of claim 1 further comprising:
   determining that the CPU affinity is greater than the second predetermined threshold;
   processing a next interrupt to the received interrupt the interrupt context mode; and
   processing the I/O on the processor associated with the received interrupt to completion.

4. The computer-implemented method of claim 3, wherein the second predetermined threshold is a configurable value set by the device driver.

5. The computer-implemented method of claim 1 further comprising offloading a workload to a designated kernel thread in response to determining that the work limit has been reached.

6. A system, comprising: a plurality of processors; and a memory coupled to each of the plurality of processors; and a plurality of adapters coupled to the plurality of processors; wherein a processor of the plurality of processors is operable to: receive an interrupt; and wherein device drivers for each of the plurality of adapters are operable to: determine a dispatch latency for an associated kernel thread is greater than a first predetermined threshold; switch to an interrupt context mode; and process an I/O on the processor associated with the received interrupt to completion; calculate a central processing unit (CPU) affinity for the plurality of processors in response to the dispatch latency time being below the first predetermined threshold; determine that a work limit has been reached in response to the CPU affinity being below a second predetermined threshold in response to calculate the CPU affinity; and process the I/O on a processor of the plurality of processors not associated with the received interrupt to completion in response to determining that the work limit has not been reached.

7. The system of claim 6, wherein the first predetermined threshold is a configurable value set by the device driver.

8. The system of claim 6, wherein each of the plurality of adapters is further operable to:
   determine that the CPU affinity is greater than the second predetermined threshold;
   process a next interrupt to the received interrupt the interrupt context mode; and
   process the I/O on the processor associated with the received interrupt to completion.

9. The system of claim 8, wherein the second predetermined threshold is a configurable value with defaults set by the device driver.

10. The system of claim 6, wherein each of the plurality of adapters is further operable to offload a workload to a designated kernel thread in response to determining that the work limit has been reached.

11. A computer program product for operating a computer system using a workload manager to control a dynamic thread mode switch, the computer program product comprising: a non-transitory computer readable storage medium having stored thereon first program instructions executable by a processor to cause the processor to: receive an interrupt; determines that the dispatch latency for an associated kernel thread is greater than a first predetermined threshold; switch to an interrupt context mode; and process an I/O on the processor associated with the received interrupt to completion; calculate a central processing unit (CPU) affinity for the plurality of processors in response to the dispatch latency time being below the first predetermined threshold; determine that a work limit has been reached in response to the CPU affinity being below a second predetermined threshold in response to calculate the CPU affinity; and process the I/O on a processor of the plurality of processors not associated with the received interrupt to completion in response to determining that the work limit has not been reached.

12. The computer program product of claim 11 further comprising:
   determining that the CPU affinity is greater than the second predetermined threshold;
   processing a next interrupt to the received interrupt the interrupt context mode; and
   processing the I/O on the processor associated with the received interrupt to completion.

* * * * *